United States Patent
Liu

(10) Patent No.: US 10,324,731 B2
(45) Date of Patent: Jun. 18, 2019

(54) MULTIMODE STARTUP METHOD FOR INTELLIGENT DEVICE AND THE SYSTEM THEREOF

(71) Applicant: SHENZHEN SKYWORTH-RGB ELECTRONIC CO., LTD, Shenzhen (CN)

(72) Inventor: Jinpeng Liu, Shenzhen (CN)

(73) Assignee: SHENZHEN SKYWORTH-RGB ELECTRONIC CO., LTD, Shenzhen (CN)

(*) Notice: Subject to any disclaimer, the term of this patent is extended or adjusted under 35 U.S.C. 154(b) by 86 days.

(21) Appl. No.: 15/323,934

(22) PCT Filed: Jan. 6, 2016

(86) PCT No.: PCT/CN2016/070266
§ 371 (c)(1),
(2) Date: Jan. 4, 2017

(87) PCT Pub. No.: WO2017/041408
PCT Pub. Date: Mar. 16, 2017

(65) Prior Publication Data
US 2017/0199745 A1    Jul. 13, 2017

(30) Foreign Application Priority Data
Sep. 8, 2015  (CN) .......................... 2015 1 0564881

(51) Int. Cl.
G06F 9/4401 (2018.01)
G06F 9/445 (2018.01)
G06N 5/02 (2006.01)

(52) U.S. Cl.
CPC .......... *G06F 9/4406* (2013.01); *G06F 9/4401* (2013.01); *G06F 9/44505* (2013.01); *G06N 5/02* (2013.01)

(58) Field of Classification Search
CPC ... G06F 9/4406; G06F 9/4401; G06F 9/44505
(Continued)

(56) References Cited

U.S. PATENT DOCUMENTS

| 2003/0135728 A1 | 7/2003 | Klave et al. |
| 2005/0010662 A1* | 1/2005 | Prabhakar ............... G06F 9/524 709/224 |

(Continued)

FOREIGN PATENT DOCUMENTS

| CN | 1555010 A | 12/2004 |
| CN | 101227681 A | 7/2008 |

(Continued)

OTHER PUBLICATIONS

Wikipedia, Operating System, Sep. 6, 2014, https://en.wikipedia.org/wiki/Operating_system as cataloged Sep. 6, 2014 (Year: 2014).*

(Continued)

*Primary Examiner* — Austin Hicks
(74) *Attorney, Agent, or Firm* — Anova Law Group, PLLC

(57) ABSTRACT

The present invention provides a multimode startup method for intelligent device and the system thereof, through predefining a plurality of startup modes, and based on a plurality of application scenarios according to the application and service programs installed in the intelligent device, assigning the said application programs and service programs into different startup modes, then receiving a control instruction sent from the user, identifying the startup mode according to the said control instruction, before loading the application and service programs list assigned to the specific startup mode according to the identified startup mode. The method and system stated in the present invention, provides different startup modes for a user to select, in order to achieve a goal of improving a startup speed, separating an (Continued)

application scenario, and simplifying a system for obtaining more sources, which makes a user reach the application scenario faster, and obtain a clearer and faster operation experience in the scenario, thus it owns a strong practical value and a wide application scenario.

17 Claims, 2 Drawing Sheets

(58) Field of Classification Search
USPC .......................................................... 713/2
See application file for complete search history.

(56) References Cited

U.S. PATENT DOCUMENTS

| | | |
|---|---|---|
| 2009/0089569 A1 | 4/2009 | Baribault et al. |
| 2009/0191854 A1 | 7/2009 | Beason |
| 2012/0159144 A1 | 6/2012 | Sengupta et al. |
| 2015/0212747 A1* | 7/2015 | Hutchison ............... G06F 21/53 711/154 |

FOREIGN PATENT DOCUMENTS

| | | |
|---|---|---|
| CN | 101650657 A | 2/2010 |
| CN | 102681897 A | 9/2012 |
| CN | 103136023 A | 6/2013 |
| CN | 103412789 A | 11/2013 |
| CN | 103686363 * | 3/2014 |
| CN | 105159721 A | 12/2015 |
| EP | 2216705 A1 | 8/2010 |
| WO | 2012023150 A2 | 2/2012 |

OTHER PUBLICATIONS

How to Geek, Dual Booting Explained, Jul. 24, 2014, https://www.howtogeek.com/187789/dual-booting-explained-how-you-can-have-multiple-operating-systems-on-your-computer/ as cataloged Jul. 24, 2014 (Year: 2014).*

The World Intellectual Property Organization (WIPO) International Search Report for PCT/CN2016/070266 dated Jun. 8, 2016 pp. 1-7.

* cited by examiner

MULTIMODE STARTUP METHOD FOR INTELLIGENT DEVICE AND THE SYSTEM THEREOF

CROSS-REFERENCES TO RELATED APPLICATIONS

This application is a national stage application of PCT Patent Application No. PCT/CN2016/070266, filed on Jan. 6, 2016, which claims priority to Chinese Patent Application No. 2015105648814, filed on Sep. 8, 2015, the content of all of which is incorporated herein by reference.

FIELD OF THE INVENTION

The present invention relates to the field of intelligent device control technology, and, more particularly, to a multimode startup method for intelligent device and the system thereof.

BACKGROUND

The present invention relates to a technical field of consumer electronic product, which is a software applied to achieving starting an intelligent device at a customization mode. It is well known that, currently, a plurality of all kinds of intelligent systems of a plurality of current intelligent devices are relatively complicated, having a relatively long startup time, also, after the device has been started up, a plurality of various services and processes will run at a same time, which may cause a plurality of unnecessary source occupations, thus seriously effects a user's experience.

Intelligent systems are all currently pursuing a functional comprehension thereof, and installing an application program intentionally or unintentionally, from a third party or an application store, may increase a system burden heavier, thus extends the startup time and brings an inconvenience to the user.

Therefore, the current technology needs to be improved and developed.

BRIEF SUMMARY OF THE DISCLOSURE

According to the above described defects, the purpose of the present invention is providing a multimode startup method for intelligent device and the system thereof, in order to solve the problem in the prior arts that having a plurality of defects including a long start time due to too many applications running at startup when starting an intelligent device, or hard to operate by the user due to a complicated operation and control interface, or wasting sources due to a plurality of unnecessary applications starting to run.

In order to achieve the above mentioned goals, the technical solution of the present invention to solve the technical problems is as follows:

A multimode startup method for intelligent device, wherein, it comprises:

predefining a plurality of startup modes, and assigning a plurality of application programs and service programs into different startup modes based on a plurality of application scenarios according to the application programs and service programs installed in the intelligent device;

receiving a control instruction sent from the user, identifying the startup mode according to the control instruction, before loading the application and service programs list assigned to the specific startup mode according to the current startup mode.

The said multimode startup method for intelligent device, wherein, after assigning the application programs and the service programs into different startup modes, it further includes:

based on an information of both application programs and service programs assigned to different startup modes, an application and service integration list including both the application programs and the service programs corresponding to each startup mode is automatically generated.

The said multimode startup method for intelligent device, wherein, based on the identified startup mode, the system reads the application and service integration list corresponding to the startup mode, and obtains the information on application programs and service programs assigned to the startup mode, before loading the list of application programs and service programs assigned to the startup mode.

The said multimode startup method for intelligent device, wherein, after loading the application and service programs list, it further includes:

examining the running application programs and service programs at every preset time period, and at the same time of terminating the application programs or service programs assigned to startup modes other than the current startup mode, copying an information file of the application programs or service programs, as well as modifying a running path for startup.

The multimode startup method for intelligent device, wherein, receiving a control instruction sent from the user, identifying the startup mode according to the control instruction, includes:

after receiving the control instruction of entering the startup mode sent from the user, displaying a dialog box for selecting the startup mode; and receiving a startup mode selected by the user from the dialog box.

A multimode startup system for intelligent device, wherein, it comprises:

a mode definition module, applied to predefining a plurality of startup modes, also, based on a plurality of application scenarios corresponding to the application and service programs installed in the intelligent device, assigning the said application programs and service programs into different startup modes;

a startup mode control module, applied to receiving a control instruction sent from the user, identifying the startup mode according to the said control instruction, before loading the application and service programs list assigned to the specific startup mode corresponding to the identified startup mode.

The said multimode startup system for intelligent device, wherein, the said mode definition module further comprises:

a maintenance list generation unit, applied to automatically generating an application and service integration list including the information of both the application programs and the service programs corresponding to each startup mode, based on an information of both application programs and service programs assigned to different startup modes.

The said multimode startup system for intelligent device, wherein, the said startup mode control module comprises:

an application information obtaining unit, applied to reading the application and service integration list corresponding to the current startup mode, and obtaining the information on application programs and service programs assigned to the current startup application mode.

The said multimode startup system for intelligent device, wherein, the startup mode control module further comprises:

a running examination unit, applied to examining the running application programs and service programs at every preset time period, at the same time of terminating the application programs or service programs not assigned to the current startup mode, copying an information file of the application programs and service programs, as well as modifying the running path for startup.

The multimode startup system for intelligent device, wherein, the mode definition module comprises:

an instruction identification unit, applied to displaying a dialog box for the startup mode selection, after receiving the control instruction of entering the startup mode sent from the user; and receiving a startup mode selected by the user from the said dialog box.

Benefits: The present invention provides a multimode startup method for intelligent device and the system thereof, through predefining a plurality of startup modes, and based on a plurality of application scenarios corresponding to the application and service programs installed in the intelligent device, assigning the said application programs and service programs into different startup modes, then receiving a control instruction sent from the user, identifying the startup mode according to the said control instruction, before loading the list of application and service programs assigned to the specific startup mode according to the identified startup mode. The method and system stated in the present invention, provides different startup modes for a user to select, in order to achieve a goal of improving a startup speed, separating an application scenario, and simplifying a system for obtaining more sources, which makes a user reach the application scenario faster, and obtain a clearer and faster operation experience in the scenario, thus it owns a strong practical value and a wide application scenario.

DETAILED DESCRIPTION OF EMBODIMENTS

The present invention provides a multimode startup method for intelligent device and the system thereof, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Since currently, a system of a mainstream intelligent device supports a multi-process operation and a multi-task mode, thus it has a relatively heavy burden on itself, and a limited optimization on its performance, also, it has a relatively large open permission for non-system preset applications, which may result in the following problems:

There are too many application and service programs need to load, resulting in a long startup time and affecting a user's experience; there is an over complicated function and operation interface, bringing a great deal of inconvenience to a user's selection and operation; while both the multi-process and multi-task may cause some unnecessary waste of resource, and affect a user's operation and control experience.

Figure 1:
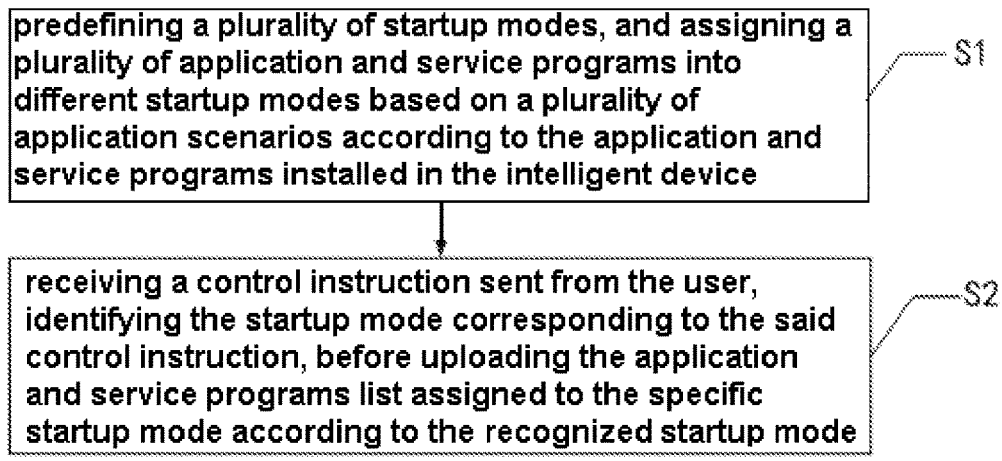
FIG. 1 illustrates a flowchart on the multimode startup method for intelligent device as provided in the present invention.

In order to solve the above mentioned problems, the present invention has provided a multimode startup method for intelligent device, shown as FIG. 1, the said method includes:

S1. predefining a plurality of startup modes, and assigning a plurality of application and service programs into different startup modes based on a plurality of application scenarios corresponding to the said application programs and service programs installed in the intelligent device.

Figure 2:
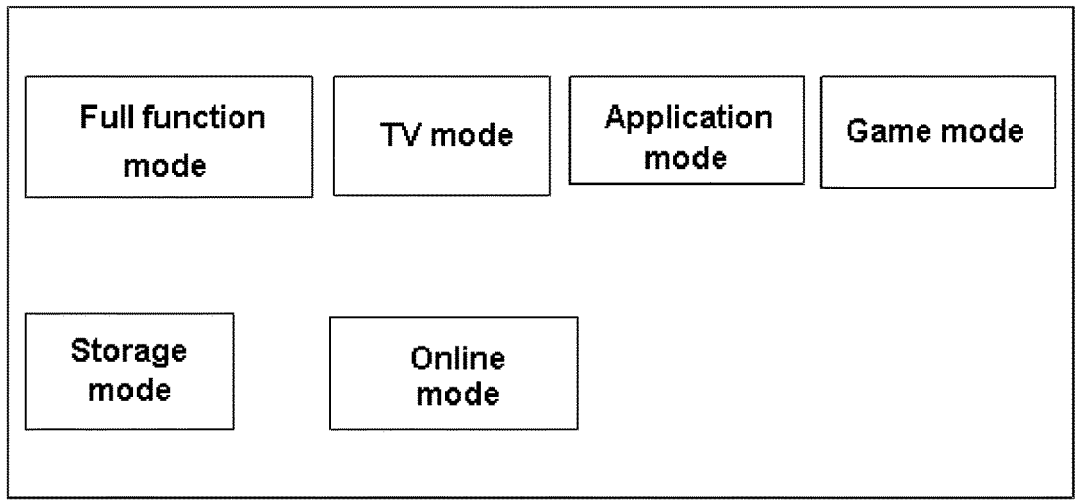
FIG. 2 illustrates an array diagram on an application scenario mode corresponding to a startup mode of the intelligent device as provided in the present invention.

The intelligent device in the current technology, in order to find a needed application program or service program in a fast speed, usually, may arrange a plurality of different usage modes, shown as FIG. 2, such as: a full function mode, a TV mode, an online mode, a storage mode, an application mode or a game mode, and a user may enter a corresponding mode according to a requirement.

In the present step, first defining in the intelligent device the above said application scenario mode corresponding to the said application scenario of the application program, so as to being able to correspond to a plurality of startup modes corresponding to the said scenario mode, for example: the full function mode is corresponding to a full functions startup mode which displays all functions after startup, the TV mode is corresponding to a TV startup mode which loads the application and service programs related to a TV function only after startup, and the online mode is corresponding to a startup mode loading the application and service programs related to a browser and a player only after startup.

After finishing defining the above said a plurality of startup modes, all application and service programs installed in the intelligent device may be assigned to different startup modes corresponding to their application scenario of usage.

In the present step, it may be considered that, due to it is needed to keep a fundamental service of an Android system in each application scenario mode, it is needed to make a plurality of basic and general simplifications according to an underlying fundamental system, removing a plurality of unnecessary apk from the original system, including: a native contact, a wallpaper, a map, an SMS, a techno music, a setup wizard, a document software, a calendar, a calculator and more, while keeping a basic and general part as shown in table 1-1 only (note: for home, setting, local media and other modules, since they may also be defined and customized in an upper layer, thus the original apk are also be deleted at the same time).

TABLE 1-1

| Taking an Andriod 4.2 system package as an example | Description |
| --- | --- |
| ApplicationsProvider.apk | An application programs storage program, a program manager. |

TABLE 1-1-continued

| Taking an Andriod 4.2 system package as an example | Description |
| --- | --- |
| CertInstaller.apk | Certification |
| ConfigUpdater.apk | Settings update |
| DefaultContainerService.apk | Software package visiting |
| DrmProvider.apk | DRM protected data storage service |
| HoloSpiralWallpaper.apk | Wallpaper related |
| InputDevices.apk | Newly added after version 4.1 |
| KeyChain.apk | Password managing service |
| MediaProvider.apk | Media storage |
| PackageInstaller.apk | Managing packages installation |
| SharedStorageBackup.apk | Sharing storage backup |
| Superuser.apk | Appearing after rooting |
| SystemUI.apk | User's system interface |

Therefore, in the present step, an emphasis shall be placed on removing the independent application and service programs in the upper layer, and only keeping a main function and a plurality of associated or ancillary functions thereof, as shown in table 1-2, some customized upper layer basic functions and services may be retained in each mode, include a home, setting, signal source, device service and more. Taking the TV mode as an example, the upper layer needs only to retain those individual services and the main apk required to realize the whole TV part, while retaining a plurality of setting modules for basic control (note: settings in all kinds of application scenario modes should all be retained).

TABLE 1-2

| Full function mode | Retaining all special upper layer applications and services of each mode listed below |
| --- | --- |
| TV mode | Retaining a plurality of necessary services and applications for a TV function, such as TV.apk and TVService.apk |
| Online mode | Retaining a plurality of browser, video center, player associated services and applications |
| Storage mode | Retaining a plurality of local media or player associated services and applications |
| Application mode | Retaining an application store, a plurality of installer associated services and applications |
| Game mode | Retaining an application store, a game hall, a plurality of installer associated services and applications |

S2, receiving a control instruction sent from the user, identifying the startup mode according to the said control instruction, before loading the application and service programs list assigned to the specific startup mode corresponding to the identified startup mode.

After finishing assigning the startup modes according to the application scenario mode in the above said step, receiving a control instruction sent from the user, identifying which startup mode the user selected is, before loading the application and service programs assigned to the specific startup mode according to that of the user selection.

Specifically, in order for a better determination of the control instructions sent from the user belonging to which startup mode corresponding to the application scenario mode, it may be achieved through the following two methods in the present step:

The first: after receiving the control instruction sent from the user, deciding whether the setting of the intelligent device operation system has started an independent mode function or not, if it has, then the startup mode according to the said control instruction is one saved in a memory of the operation system; otherwise, the startup mode according to the said control instruction is a full function startup mode by default.

In the present identification method, the user first selects starting the startup mode function in the intelligent device, the said startup mode is corresponding to an application scenario mode, the user selects a startup mode according to his requirements, and the intelligent device starts corresponding to the user selected startup mode automatically after powered on.

The second: after receiving the control instruction of entering the startup mode sent from the user, displaying a dialog box for startup mode selection; and receiving a user selected startup mode from the said dialog box.

What stated in the present method is, the user sends out a control instruction to start the startup mode through pressing a button, and after receiving the control instruction, the intelligent device picks out the required startup mode from the displayed dialog box on startup modes, and enters the wanted application scenario mode.

In the above said step S1, in order to maintain each startup mode better, after assigning the said application programs and the said service programs into different startup modes, it further includes:

based on an information of both application programs and service programs assigned to different startup modes, an application and service integration list including both the application programs and the service programs corresponding to each startup mode is automatically generated. That is, the system may maintain the application programs and service programs in each startup mode, based on the said application and service programs integration list, and obtain the information of the application programs and the service programs in the said startup mode, furthermore, based on the identified startup mode, the system may read the application and service integration list corresponding to the said startup mode, and obtain the information on application programs and service programs assigned to the startup mode, before loading the list of application programs and service programs assigned to the startup mode.

In order to better monitoring the application programs and service programs running in each startup mode, after loading the said application programs and service programs list, it further includes:

examining the running application programs and service programs at every preset time period, at the same time of terminating the application programs or service programs assigned to startup modes other than the current startup mode, making a copy of an information file of the application programs and service programs, as well as modifying a running path for startup, that is, identifying a running condition of those unnecessary processes intermittently, if it is not a necessary process, close it to relieve the running burden of the system.

In order to make a more specific description to the method stated in the present invention, a plurality of embodiments on specific implementations are given below, for a further explanation.

Figure 3A:
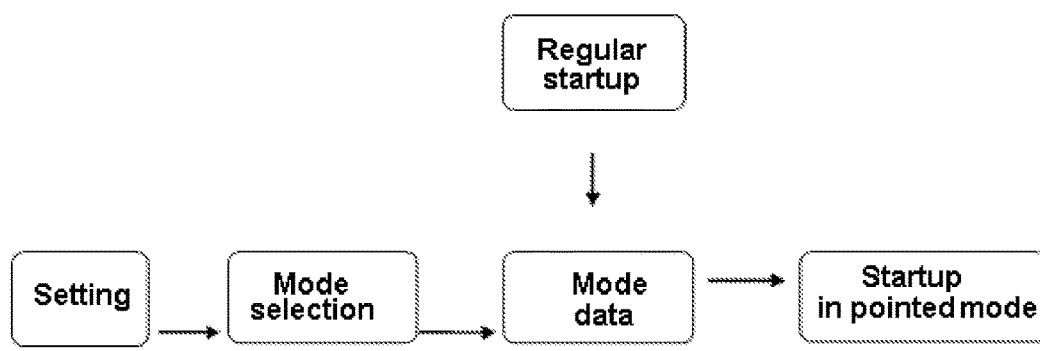
FIG. 3*a* illustrates a step diagram on a first embodiment of starting the startup mode in the embodiments on method as provided in the present invention.

First, after defining the startup modes, the user may achieve a selection of the startup mode in two methods, as listed below:

The first method: all are achieved through a menu control, shown as FIG. 3a, which needs no special hardware addition for supporting; however, it may only adopt a backward control, that is, controlling the subsequent startup modes.

The user selects whether start an independent mode function or not through a setting menu of the system, adds a functional menu item into the setting menu: "start in a specific mode", and the menu options are: "None", "TV mode", "Online video mode", "Local playing mode", "Game mode", and "Application mode" respectively; the default system value for the current selection is "None", that is, the system starts with a full function startup mode by default, and, each time, when the user turns on the system after turning off, the system goes to the normal full function startup mode. However, if the full function startup mode is selected, the startup speed of the system will be slow, and the function interface will be complicated to operate after startup, a plurality of useless processes will consume the resources and cause a poor experience for the system.

When the user wants to set his own specific mode on a next time or each time afterwards (such as a user of a set-top box, will always expect starting at a TV mode; a user owning a better network and mainly watching an online video and a live show, will always expect his TV starting at an "online video mode"), the user may set the current value of the menu item to be a pointed mode, and when the system starts the next time, it will read the data on modes saved in the system in a priority, and enter a certain specific mode after an automatic determination.

Each mode must correspond to a list of services and applications, and the system will control starting in a priority that, a plurality of system level services and applications, as well as the necessary extra services and applications for the specific mode only, while blocking the start of other services, or adopting a guard process applied to controlling the start of other processes (a kill operation may be performed if detected).

Figure 3B:
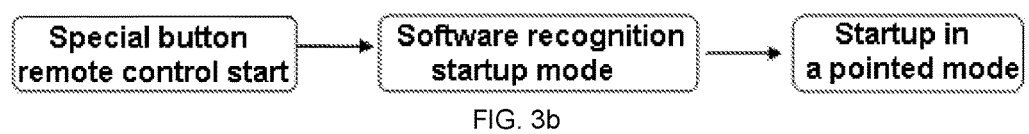
FIG. 3*b* illustrates a step diagram on a second embodiment of starting the startup mode in the embodiments on method as provided in the present invention.

The second method: all are achieved through a special button control method, shown as FIG. 3b, this specific method is flexible, the user may actively select a startup mode when turning on the system, however, an extra button will be added, and asking the user for an extra step of operation to select the needed mode after the system is turned on.

There will be two standby buttons set on the user's remoter or keypad, one is a normal standby button, when clicking the specific standby button and starting the system, the system will enter a normal full function startup mode. Another is a special mode start button (named as a K button temporarily), which also provides the standby function, however, the key value is different to that of the standby button, when the system receives by IR that the special K button is starting, an extra dialog box will be added when a normal system kernel is starting, which is applied for the user to selecting a certain startup mode. After the user has selected a certain startup mode manually, the system will enter the specific startup mode following a similar process and method according to the last method. Comparing the present approach to the last implementation method, a biggest advantage is that the user may select whether start following a pointed mode or not, and which starting mode will be adopted until the TV starts.

The present invention is based on a current mainstream intelligent operation system, it may improve the device by bringing a selection and customization of the startup modes, and may bring a brand new operation experience for a product. The present invention may be applied not only in a field of TV, but also in a plurality of intelligent terminals including cell phones and pads.

It should be noted that, in specific implementations, for a question of how to switch functions between the above said startup mode and application scenario mode, it may be solved by adopting a switch of a home button in a fundamental service of an upper system (note that, the service should be a part of the upper system, and should be retained in every mode), that is, when the system receives that the home button is pressed, it will first identify the startup mode switched by the home button, before dynamically loading the applications entry list needed to show up, based on the identified startup mode.

It is conceivable that, if there is unnecessary coupling between the applications, it will bring a plurality of difficulties to a realization of scenarios in the mode, wherein, the biggest difficulty is finding an excessive dependency and association in UI presentation and logic between functions, which may cause no way to simplify applications and services. Thus, it should pay attention to reduce couplings between programs in developing, in order to support the realization of multimode startup scenario more flexibly. For example, a service is realizing a single function as much as possible, and those public or fundamental services may be united in a single service to realize. For example, when developing a partial function, some general methods may be met, such as device reading, outside communication and more, they should be placed in a fundamental service as possible (temporally named as StandardService, or SS), wherein, SS shall be retained in all modes, all functions and interfaces of the TV function may be achieved by 1-2 apk, all functions and interfaces of the media part function may be achieved by 1-2 apk, same as the application store, in such a way, blocking in each mode the startup of special apk of other modes may be achieved.

Specifically, for those application programs and service programs not starting automatically when the system starts, then it will be enough if it is possible to hide their entries into different application scenario modes, that is, they may be customized dynamically corresponding to different startup modes. For those application programs or service programs running actively after the system starts, such as: TV service, local media service and other services in the application center, which may be realized by a fundamental service program through an xml arrangement method, such as the above said SS controlling the startup of these functions, after the system starts, this fundamental service program may detect the current startup mode, and make sure not starting those modules and services needn't start in the specific startup mode. For some applications and services from a third party, if we want to control them not starting in some modes, it may be achieved by filtering a directory of data/app containing those application apk based on the current mode, when the system starts, and under a control of a startup script of the system, those useless apk in the directory will be temporally copied to other paths to control them from being started and run.

Figure 4:
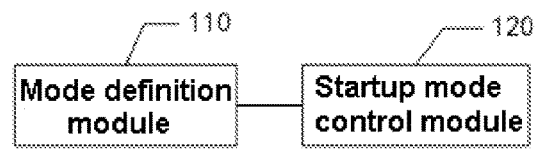
FIG. 4 illustrates a schematic diagram of the multimode startup system for intelligent device as provided in the present invention.

In the context of the method described above, the present invention further provides a multimode startup system for intelligent devices, shown as FIG. 4, the said system comprises:

a mode definition module 110, applied to predefining a plurality of startup modes, also, based on a plurality of application scenarios corresponding to the application and service programs installed in the intelligent device, assigning the said application programs and service programs into different startup modes;

a startup mode control module 120, applied to receiving a control instruction sent from the user, identifying the startup mode according to the said control instruction, before loading the application and service programs list assigned to the specific startup mode corresponding to the identified startup mode.

The said mode definition module further comprises:

a maintenance list generation unit, applied to automatically generating an application and service integration list including the information of both the application programs and the service programs corresponding to each startup mode, based on an information of both application programs and service programs assigned to different startup modes.

The said startup mode control module comprises:
an application information obtaining unit, applied to reading the application and service integration list according to the said current startup mode, and obtaining the information on application programs and service programs assigned to the current startup application mode.

The said startup mode control module further comprises:
a running examination unit, applied to examining the running application programs and service programs at every preset time period, at the same time of terminating the application programs or service programs not assigned to the said startup mode, making a copy of an information file of the application programs and service programs, as well as modifying the running path for startup.

The said mode definition module comprises:
an instruction identification unit, applied to displaying a dialog box for the startup mode selection, after receiving the control instruction of entering the startup mode sent from the user; and receiving a startup mode selected by the user from the dialog box.

The present invention provides a multimode startup method for intelligent device and the system thereof, through predefining a plurality of startup modes, and based on a plurality of application scenarios corresponding to the application and service programs installed in the intelligent device, assigning the said application programs and service programs into different startup modes, then receiving a control instruction sent from the user, identifying the startup mode according to the said control instruction, before loading the list of application and service programs assigned to the specific startup mode corresponding to the identified startup mode. The method and system stated in the present invention, provides different startup modes for a user to select, in order to achieve a goal of improving a startup speed, separating an application scenario, and simplifying a system for obtaining more sources, which makes a user reach the application scenario faster, and obtain a clearer and faster operation experience in the scenario, thus it owns a strong practical value and a wide application scenario.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A multimode startup method for an intelligent device, comprising:
predefining a plurality of startup modes, and assigning a plurality of application programs and service programs into different startup modes of the plurality of startup modes based on a plurality of application scenarios corresponding to the application programs and service programs installed in the intelligent device, wherein a plurality of upper layer functions of the plurality of application programs are retained in all the plurality of startup modes, and the plurality of upper layer functions comprise one or more of ApplicationsProvider.apk, CertInstaller.apk, ConfigUpdater.apk, DefaultContainerService.apk, DrmProvider.apk, HoloSpiralWallpaper.apk, InputDevices.apk, KeyChain.apk, MediaProvider.apk, PackageInstaller.apk, SharedStorageBackup.apk, Superuser.apk, and System UI.apk;
receiving a control instruction sent from a user, identifying a current startup mode from the plurality of startup modes according to the control instruction;
loading an application and service programs list assigned to the current startup mode to the intelligent device;
examining the application programs and service programs currently running in the intelligent device under the current startup mode every preset time period; and
terminating the application programs and service programs based on the assigning the plurality of application programs and service programs, wherein when the application programs and service programs are not assigned to the current startup mode, the application programs and service programs is terminated.

2. The multimode startup method for the intelligent device according to claim 1, after loading the application programs and service programs list, further comprising:
at the same time of terminating the application programs and service programs not assigned to the current startup mode, making a copy of an information file of the application programs and service programs, and modifying a running path of the terminated application programs and service programs.

3. The multimode startup method for the intelligent device according to claim 1, wherein, receiving the control instruction sent from the user, identifying the current startup mode from the plurality of startup modes according to the control instruction, comprises:
after receiving the control instruction of entering a startup mode sent from the user, displaying a dialog box for selecting the startup mode; and receiving the startup mode selected by the user from the dialog box.

4. A multimode startup method for an intelligent device, comprising:
predefining a plurality of startup modes, and assigning a plurality of application programs and service programs into different startup modes of the plurality of startup modes based on a plurality of application scenarios corresponding to the application programs and service programs installed in the intelligent device, wherein a plurality of upper layer functions of the plurality of application programs are retained in all the plurality of startup modes, and the plurality of upper layer functions comprise one or more of ApplicationsProvider.apk, CertInstaller.apk, ConfigUpdater.apk, DefaultContainerService.apk, DrmProvider.apk, HoloSpiralWallpaper.apk, InputDevices.apk, KeyChain.apk, MediaProvider.apk, PackageInstaller.apk, SharedStorageBackup.apk, Superuser.apk, and System UI.apk;
receiving a control instruction sent from a user, identifying a current startup mode from the plurality of startup modes according to the control instruction;
loading an application and service programs list assigned to the current startup mode to the intelligent device;
based on an information of the application programs and service programs assigned to different startup modes of the plurality of startup modes, automatically generating an application and service integration list including the application programs and the service programs according to each startup mode;
examining the application programs and service programs currently running in the intelligent device under the current startup mode every preset time period; and
terminating the application programs and service programs based on the assigning the plurality of application programs and service programs, wherein when the application programs and service programs are not assigned to the current startup mode, the application programs and service programs is terminated.

5. The multimode startup method for the intelligent device according to claim 4, further comprising:
based on the current startup mode, reading the application and service integration list corresponding to the current startup mode, and
obtaining the information of the application programs and service programs assigned to the current startup mode, before loading the application programs and service programs list assigned to the current startup mode.

6. The multimode startup method for the intelligent device according to claim 4, further comprising:
at the same time of terminating the application programs and service programs not assigned to the current startup mode, making a copy of an information file of the application programs and service programs, and modifying a running path of the terminated application programs and service programs.

7. The multimode startup method for the intelligent device according to claim 4, wherein, receiving the control instruction sent from the user, identifying the current startup mode from the plurality of startup modes according to the control instruction, comprises:
after receiving the control instruction of entering a startup mode sent from the user, displaying a dialog box to select the startup mode; and receiving the startup mode selected by the user from the dialog box.

8. The multimode startup method for the intelligent device according to claim 5, further comprising:
at the same time of terminating the application programs and service programs not assigned to the current startup mode, copying an information file of the application programs and service programs, and modifying the running path of the terminated application programs and service programs.

9. The multimode startup method for the intelligent device according to claim 8, wherein, receiving the control instruction sent from the user, identifying the current startup mode from the plurality of startup modes according to the control instruction, includes:
after receiving the control instruction of entering a startup mode sent from the user, displaying a dialog box for selecting the startup mode; and receiving the startup mode selected by the user from the dialog box.

10. A multimode startup system for an intelligent device, comprising:
a memory; and
a processor coupled to the memory, wherein the processor is configured to:
predefine a plurality of startup modes, and assign a plurality of application programs and service programs into different startup modes of the plurality of startup modes based on a plurality of application scenarios corresponding to the application programs and service programs installed in the intelligent device, wherein a plurality of upper layer functions of the plurality of application programs are retained in all the plurality of startup modes, and the plurality of upper layer functions comprise one or more of ApplicationsProvider.apk, CertInstaller.apk, ConfigUpdater.apk, DefaultContainerService.apk, DrmProvider.apk, HoloSpiralWallpaper.apk, InputDevices.apk, KeyChain.apk, MediaProvider.apk, PackageInstaller.apk, SharedStorageBackup.apk, Superuser.apk, and System UI.apk;
receive a control instruction sent from a user, identifying a current startup mode from the plurality of startup modes according to the control instruction;
load an application and service programs list assigned to the current startup mode to the intelligent device;
examine the application programs and service programs currently running in the intelligent device under the current startup mode every preset time period; and
terminate the application programs and service programs based on the assigning the plurality of application programs and service programs, wherein when the application programs and service programs are not assigned to the current startup mode, the application programs and service programs is terminated.

11. The multimode startup system for the intelligent device according to claim 10, wherein, the processor is further configured to:
automatically generate an application and service integration list including an information of the application programs and the service programs according to each startup mode of the plurality of startup modes, based on the information of the application programs and service programs assigned to different startup modes of the plurality of startup modes.

12. The multimode startup system for the intelligent device according to claim 11, wherein, the processor is further configured to:
read the application and service integration list corresponding to the current startup mode, and
obtain the information of the application programs and service programs assigned to the current startup application mode.

13. The multimode startup system for the intelligent device according to claim 10, wherein, the processor is further configured to:
at the same time of terminating the application programs and service programs not assigned to the current startup mode, copy an information file of the application programs and service programs, and modify the running path of the terminated application programs and service programs.

14. The multimode startup system for the intelligent device according to claim 10, wherein, the processor is further configured to:
display a dialog box for selecting a startup mode, after receiving the control instruction of entering the startup mode sent from the user; and
receive the startup mode selected by the user from the dialog box.

15. The multimode startup method for the intelligent device according to claim 1, further comprising:
hiding an entry of the application programs and service programs not assigned to the current startup mode.

16. The multimode startup method for the intelligent device according to claim 4, further comprising:
hiding an entry of the application programs and service programs not assigned to the current startup mode.

17. The multimode startup system for the intelligent device according to claim 10, wherein the processor is further configured to:
hide an entry of the application programs and service programs not assigned to the current startup mode.

* * * * *